(12) United States Patent
Welle et al.

(10) Patent No.: US 12,313,438 B2
(45) Date of Patent: May 27, 2025

(54) RADAR FILL LEVEL MEASUREMENT DEVICE WITH A RADAR SYSTEM-ON-CHIP

(71) Applicant: VEGA Grieshaber KG, Wolfach (DE)

(72) Inventors: Roland Welle, Hausach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 208 days.

(21) Appl. No.: 17/658,748

(22) Filed: Apr. 11, 2022

(65) Prior Publication Data

US 2022/0236096 A1   Jul. 28, 2022

Related U.S. Application Data

(63) Continuation of application No. 16/143,208, filed on Sep. 26, 2018, now Pat. No. 11,326,926.

(30) Foreign Application Priority Data

Oct. 6, 2017   (EP) ..................................... 17195233

(51) Int. Cl.
| | |
|---|---|
| G01F 23/284 | (2006.01) |
| G01B 15/04 | (2006.01) |
| G01F 22/00 | (2006.01) |
| G01S 7/03 | (2006.01) |
| G01S 7/35 | (2006.01) |
| G01S 13/42 | (2006.01) |
| G01S 13/88 | (2006.01) |

(52) U.S. Cl.
CPC ........... *G01F 23/284* (2013.01); *G01B 15/04* (2013.01); *G01S 7/032* (2013.01); *G01S 7/35* (2013.01); *G01S 13/42* (2013.01); *G01S 13/88* (2013.01); *G01F 22/00* (2013.01)

(58) Field of Classification Search
CPC ....... G01F 23/284; G01B 15/04; G01S 7/032; G01S 7/35; G01S 13/42; G01S 13/88
USPC .............................. 342/124, 112, 129, 77, 49
See application file for complete search history.

(56) References Cited

U.S. PATENT DOCUMENTS

| | | | |
|---|---|---|---|
| 8,421,588 B1* | 4/2013 | Ross ....................... G08C 17/02 340/5.1 |
| 2002/0040596 A1* | 4/2002 | Muller ................... G01F 23/284 73/290 V |
| 2004/0119636 A1* | 6/2004 | Edvardsson ........... H01Q 1/225 342/124 |
| 2015/0253176 A1* | 9/2015 | Jirskog ..................... G01S 7/35 342/124 |
| 2017/0141453 A1* | 5/2017 | Waelde .................. G01S 13/88 |
| 2018/0136028 A1* | 5/2018 | Kleman .................... G01S 7/35 |

* cited by examiner

*Primary Examiner* — Bo Fan
(74) *Attorney, Agent, or Firm* — Fay Kaplun & Marcin, LLP

(57) ABSTRACT

A radar fill level measurement device includes an arrangement having at least one radar chip which has a plurality of transmitting channels and a plurality of receiving channels. In addition, the device includes an antenna arrangement having a plurality of transmitting elements and receiving elements. The device has more transmitting channels than transmitting elements and/or more receiving channels than receiving elements.

10 Claims, 5 Drawing Sheets

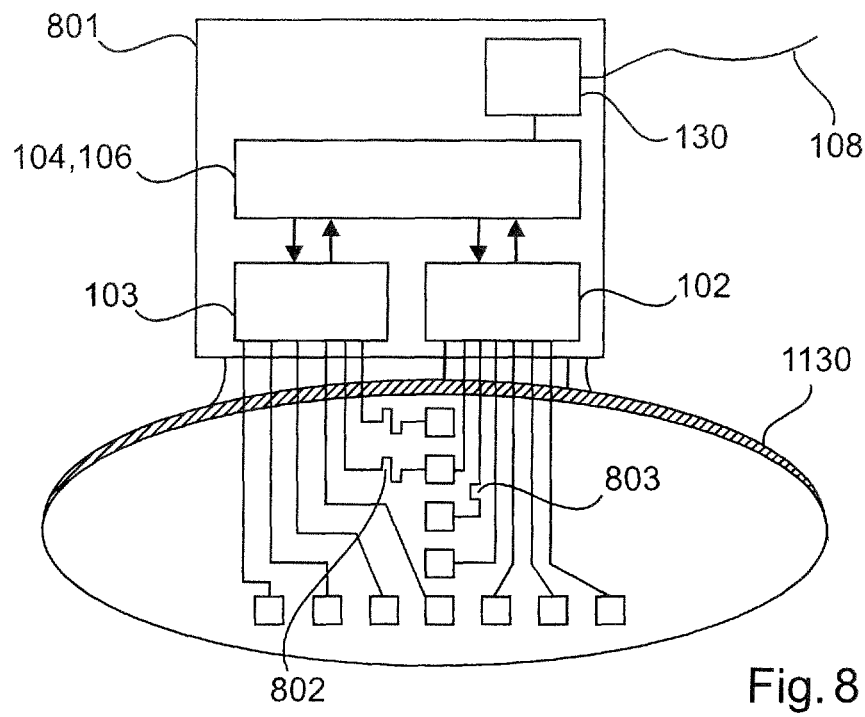
Fig. 8
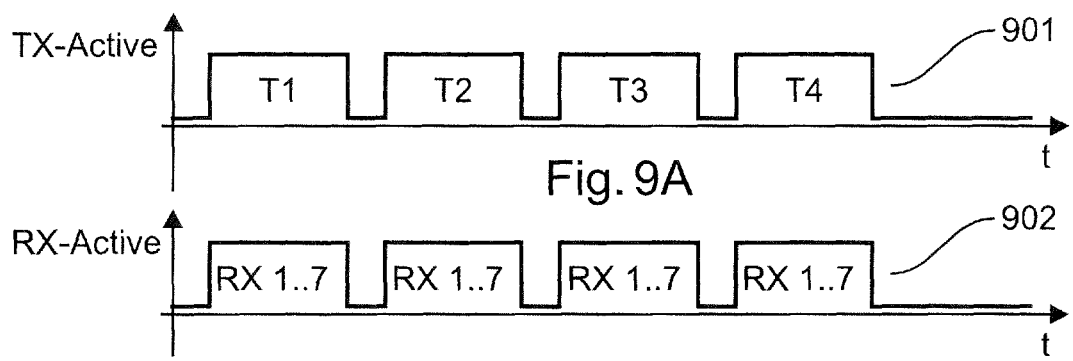
Fig. 9A
Fig. 9B
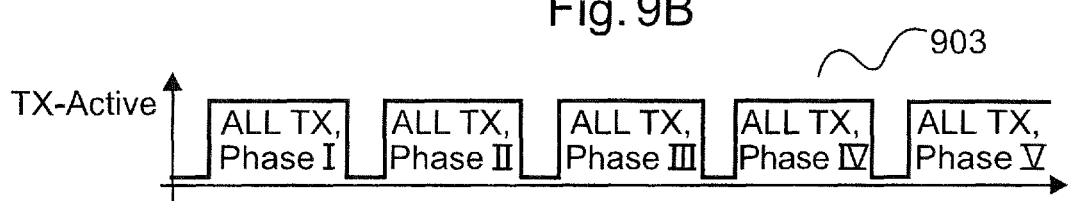
Fig. 9C
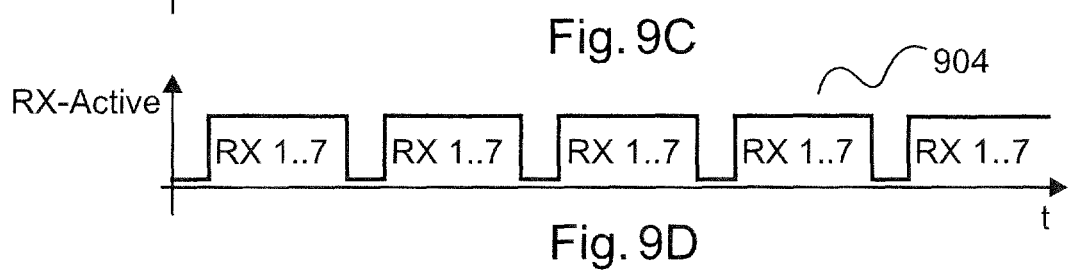
Fig. 9D

RADAR FILL LEVEL MEASUREMENT DEVICE WITH A RADAR SYSTEM-ON-CHIP

CROSS-REFERENCE TO RELATED APPLICATIONS

This application is a Continuation application of U.S. patent application Ser. No. 16/143,208 filed Sep. 26, 2018; which claims the benefit of the filing date of European Patent Application Serial No. 17 195 233.6 filed on 6 Oct. 2017, the entire content of which is incorporated herein by reference.

FIELD OF THE INVENTION

The present invention relates to fill level measurement and detection of the topology of a filling material surface in a container. In particular, the invention relates to a radar fill level measurement device for fill level measurement and/or for detecting the topology of a filling material surface in a container.

BACKGROUND

Radar fill level measurement devices are used today for fill level measurement and for detecting the topology of a filling material surface. In contrast to many other fields, the breakthrough for radar technology in fill level measurement first became possible after extremely small reflection signals could be detected and processed by the electronics of the measurement devices.

Modern fill level measurement devices and topology measurement devices that can detect the exact shape of the surface of a filling material are not only characterised by a high transmitting frequency, which is typically in the gigahertz range, for example in the range of from 75 GHz to 85 GHz, but are also capable of reliably processing amplitude differences in the reflected signal in a range of up to 100 dB or more.

In order to generate and process high-frequency transmission signals in the range of 79 GHz, a monolithic microwave integrated circuit (MMIC) can be provided. This component may have a plurality of transmitting and receiving channels, which in this application are also referred to as "radar channels", so that the filling material surface can be scanned.

The more precisely the filling material surface is intended to be scanned, the more transmitting and receiving channels are required to achieve high quality imaging, and this is associated with correspondingly high hardware outlay and energy consumption.

SUMMARY OF THE INVENTION

The present invention relates to a radar fill level measurement device for measuring a fill level of a medium or the topology of a medium in a container.

A first aspect relates to a radar fill level measurement device which is designed to measure a fill level of a medium in or outside a container and/or to detect the topology of a filling material surface in or outside a container.

The radar fill level measurement device comprises an arrangement that has one or more radar chips. A radar chip of this kind can in particular be a highly integrated radar system-on-chip (RSoC) that has a plurality of transmitting and/or receiving channels. The arrangement comprising the one or more radar chips has one or more transmitting channels for emitting in each case a transmission signal towards the filling material surface, and one or more receiving channels for receiving the transmission signals reflected from the filling material surface. One or more of the transmitting channels can also be designed as a combined transmitting-receiving channel. The radar chips can in particular be integrated microwave circuits which can also be referred to as "radar system-on-chip". A radar system-on-chip (RSoC) of this kind is a highly integrated microwave circuit which comprises circuit components for digital functions and, according to one embodiment, is capable of integrating the complete functionality of a conventional radar system for signal generation, signal processing and transfer of received signals, i.e. the reflected transmission signals, into one digital representation on a single radar chip.

Each of the transmitting channels can be designed to generate a high-frequency transmission signal having a frequency in the gigahertz range, for example in the range of from 75 GHz to 85 GHz or above.

The different components of the arrangement, i.e. in particular the radar chips, can synchronise with one another. A master chip is provided, for example, which passes a synchronisation signal to the other chips. This is accomplished via a high-frequency line arrangement which interconnects the different chips. According to one embodiment, the high-frequency line arrangement comprises a waveguide in order to reduce the line losses.

An antenna arrangement is provided which comprises a plurality of transmitting elements and receiving elements. The radar fill level measurement device has more transmitting channels than there are transmitting elements provided and/or has more receiving channels than there are receiving elements provided.

It is possible for the antenna arrangement to comprise at least two transmitting elements and/or at least two receiving elements.

A fill level measurement device for fill level and/or topology detection is specified which comprises at least one highly integrated radar chip, the transmitting elements of which are only used in part for measurement and/or the receiving elements of which are only used in part for measurement.

According to a further embodiment, the radar fill level measurement device is designed to use fewer transmitting elements for fill level measurement than there are transmitting channels provided and/or to use fewer receiving elements for fill level measurement than there are receiving channels provided.

According to a further embodiment, the arrangement comprising one or more radar chips has a plurality of radar chips, for example more than four radar chips.

According to a further embodiment, the arrangement comprising one or more radar chips has a radar chip which is designed to transmit and receive transmission signals, and an integrated microwave circuit which is designed only to transmit transmission signals or only to receive transmission signals reflected from the filling material surface.

According to a further embodiment, the radar fill level measurement device comprises a control circuit which is designed to activate one of two operating states of the radar fill level measurement device, a different number of transmitting channels and/or receiving channels being used in each of the two operating states.

According to a further embodiment, the control circuit is designed to activate or deactivate the operating state depending on the fill level.

According to a further embodiment, the control circuit is designed to activate or deactivate the operating state depending on the amplitude of the received signals.

According to a further embodiment, the control circuit is designed to deactivate a component of the arrangement that comprises the one or more radar chips for the fill level measurement, for example depending on the previously measured fill level.

According to a further embodiment, an analogue-digital converter is integrated on at least one or all of the radar chips in the arrangement, which converter is designed to convert the reflected transmission signal into a digitalised intermediate frequency signal which can be attributed to one or more transmission signals reflected from the filling material surface.

According to a further embodiment, at least two transmitting channels each have an antenna which is connected thereto.

At least two of the receiving channels likewise have an antenna which is connected thereto.

According to a further embodiment, the radar fill level measurement device is designed as an FMCW radar fill level measurement device that uses a frequency-modulated continuous wave signal for measurement, each measurement cycle including a frequency sweep that has, for example, a starting frequency of 75 GHz and a maximum frequency of 85 GHz.

According to a further embodiment, the radar fill level measurement device is designed to detect the topology of a medium in a container.

According to a further embodiment, one or each radar chip of the arrangement is based on BiCMOS technology. According to a further embodiment of the invention, the radar chips are based on SiGe technology. According to a further embodiment of the invention, the radar chips are based on HF-CMOS technology and comprise high-frequency circuit parts for frequencies of 75 GHz and above.

Embodiments are described hereinafter with reference to the drawings. Where the same reference signs are used in the following description of the figures, they denote the same or similar elements. The views in the drawings are schematic and not to scale.

BRIEF DESCRIPTION OF THE FIGURES

FIG. 8 shows a radar fill level measurement device according to one embodiment.

FIGS. 9A to 9D show sequence charts of a method according to one embodiment.

DETAILED DESCRIPTION OF EMBODIMENTS

Figure 1:
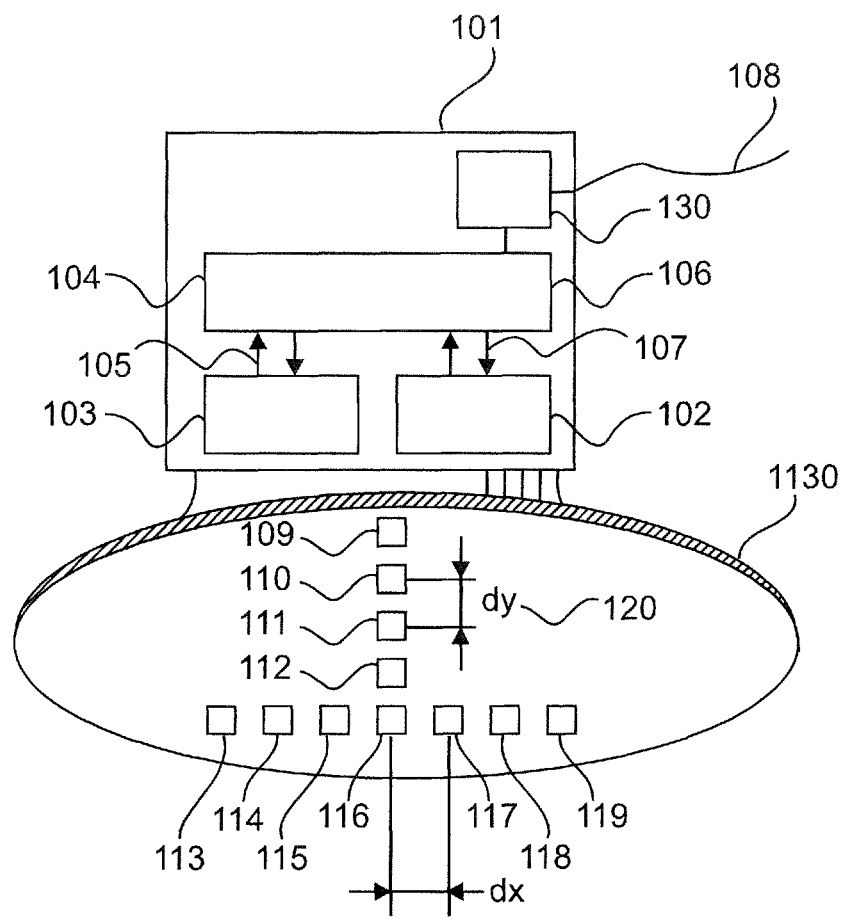
FIG. 1 shows a measurement assembly according to one embodiment.
Figure 1:
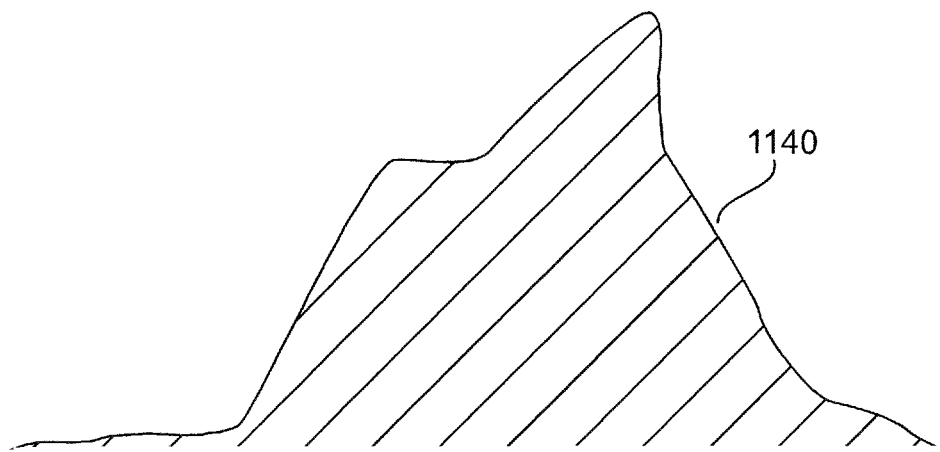

FIG. 1 shows a radar fill level measurement device 101 that is installed in a container in order to detect the topology of the surface of a filling material in the container.

The radar fill level measurement device comprises one or more highly integrated radar chips (RSoCs, radar system-on-chips) 102, 103 which have a plurality of transmitters and receivers. These can also be used in fields such as driver assistance systems, traffic monitoring, object monitoring in industrial plants, drones and many other fields. One advantage of multi-channel radar chips is that a type of beam-forming can be carried out.

In order to generate and process high-frequency signals in the range of 79 GHz, some fill level measurement devices comprise one or even a plurality of monolithic microwave integrated circuits (MMICs). Components (RSOC) that represent an alternative to the previously used MMICs can be used especially in the range between 76 GHz and 81 GHz. In order to keep the variety of components small, the RSOCs can be developed in a predefined cost-effective standard configuration that has N transmitting elements and M receiving elements, and can be produced in high quantities. Nevertheless, high variability with respect to the number of transmitting and receiving channels in real applications should be made possible.

The application proposes a fill level measurement device for measuring the fill level and/or the topology of a filling material surface using K transmitting antennas and L receiving antennas. The device comprises, for example, at least one highly integrated radar chip having N transmitting elements and M receiving elements, the number N of transmitting elements being>the number K of transmitting antennas used for measurement and/or the number M of receiving elements being>the number L of receiving antennas.

In an alternative embodiment, the number K of transmitting antennas may be greater than or equal to two. In addition or alternatively, the number L of receiving antennas may be greater than or equal to two.

In many fields of bulk material measurement, fill level measurement devices which detect the topology lead to considerably improved measurement results, and are therefore used to an increasing extent for reliable and precise monitoring of bulk material. By developing highly integrated radar chips (RSOC), radar sensors in the field of fill level measurement that image the system assembly can be simplified and designed to be cost-effective.

For example, the RSOCs comprise three transmitting channels that are independent of one another and four receiving channels that are independent of one another. It has now been found that not using all of these channels for the actual measurement can be advantageous for producing a fill level measurement device.

The measurement device 101 comprises at least one highly integrated radar chip 102, 103 which is connected to at least one evaluation unit 104 via at least one digital interface 105. At least one control unit 106, which can be a control circuit or processor, can influence the operating sequence and the configuration of the radar chips 102, 103 via at least one digital signal line 107.

The at least one evaluation unit 106 can be designed to determine at least one of the measurement values of fill level, topology, volume, or values derived therefrom, and to outwardly provide said values in a digital and/or analogue manner according to particular methods. A conventional procedure includes providing the measured value, by means of a power supply device 130, in the form of a 4-20 mA current value 108 proportional to the measured value. The high-frequency signals generated by the radar chips 102, 103 are emitted towards a filling material surface 1140 via the transmission elements 109, 110, 111, 112 of the antenna arrangement 1130. The signals reflected from the surface 114 arrive back at the antenna arrangement 1130 after a delay dependent on the distance, and are received by the receiving elements 113 to 119 and forwarded to the receiving circuits of the radar chips 102, 103.

The signals are processed within the radar chips and are provided to an external interface 105 as a digital echo signal. In the present example of the antenna arrangement 1130, the transmitting elements 109 to 112 and the receiving elements 113 to 119 are each arranged so as to be spaced apart at a distance dx=dy of less than or equal to half the wavelength of the high-frequency signals emitted towards the surface.

It should be noted that the arrangement of the antenna elements and the distance of said elements from one another can be produced in different variations. The present application, and in particular the numbering of transmitting elements 109 to 112 and receiving elements 113 to 119, is intended to be considered throughout the rest of the document as a practice-oriented embodiment in order to explain an aspect.

Figure 2:
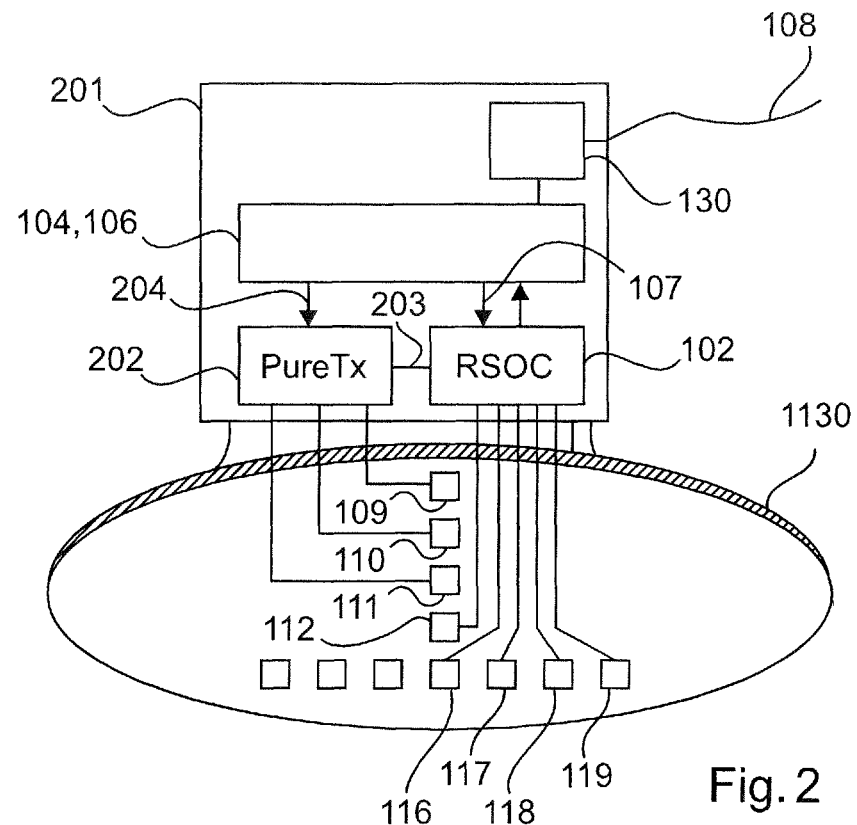
FIG. 2 shows a radar fill level measurement device according to one embodiment.

FIG. 2 shows an embodiment. The pin configuration for the position of the transmitting and receiving channels on an RSOC 102 is predefined by the component manufacturer, and only in a few cases matches the positions of the transmitting elements 109 to 112 and receiving elements 113 to 119 that are required by the system designer. Since it should simultaneously be noted that the corresponding connection lines between the chip 102 and the antenna elements 109 to 112 and 116 to 119 should be optimised in terms of high-frequency technology (small line lengths, no crossovers, as far as possible no change of position on the circuit board), one problem that often results in the practical assembly of a radar device 201 is that the desired number and position of the antennas cannot be optimally connected to corresponding RSOCs. It is therefore possible to solve the problem by combining at least one RSOC 102 with at least one pure TX-MMIC 202.

The RSOC 102 can synchronise the high-frequency signal generation within the RX-MMIC with the high-frequency signal generation within the RSOC via corresponding connection lines 203, and therefore the signals emitted via the antennas 109 to 111 can, after reflection from the filling material, be again received by the antennas 116 to 119 and be converted by the RSOC 102 into corresponding echo signals.

Using a pure TX-MMIC 202 results in clear degrees of freedom in the layout of corresponding high-frequency circuits. It is possible for not all of the channels of a TX component to be used for the measurement. The corresponding circuit stages can be deactivated by corresponding control signals 204, and this can contribute to a lower power consumption and less heating of the measurement device 201. It is possible in one configuration of this kind in particular for the TX circuit channels of an RSOC 102 to not all be connected to corresponding antenna elements 109 to 112.

The corresponding elements can be deactivated by a control signal 107. In addition, it is possible to implement an operating sequence for the RSOC within the control and/or evaluation unit 104, 106, which sequence leads to a measurement that is optimised in terms of energy and time by omitting actuation and/or evaluation of the channels that are not connected to antenna elements. It is possible for the TX-MMIC 202 to be produced by means of an RSOC, all sub-assemblies that are provided for receiving signals being deactivated during an initialisation phase.

Figure 3:
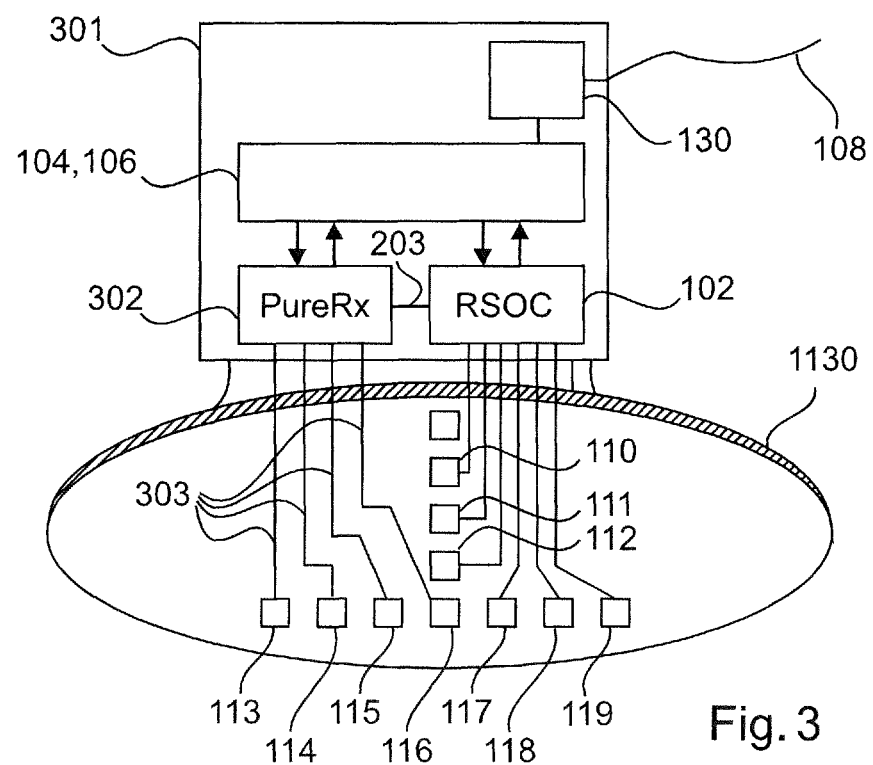
FIG. 3 shows a radar fill level measurement device according to one embodiment.

FIG. 3 shows a further embodiment of a radar level indicator 301. The system in turn consists of an integrated RSOC 102, which in the present example is connected to a pure RX-MMIC 302. The RX-MMIC facilitates a simplified system assembly, and, as a result of the corresponding positioning of the RX component 302, the high-frequency signal lines 303 in particular can be made as short as possible. The RX component receives corresponding synchronisation signals from the master chip 102 via at least one connection line 203, which synchronisation signals allow the RX component to receive signals that are generated by the RSOC 102 and emitted via the antenna 1130 and to convert them into a digital representation. It is possible for this receiving and converting to take place in a chip 302. It is also possible to use a plurality of chips, for example a receiving MMIC in conjunction with at least one external analogue-digital converter.

Figure 4:
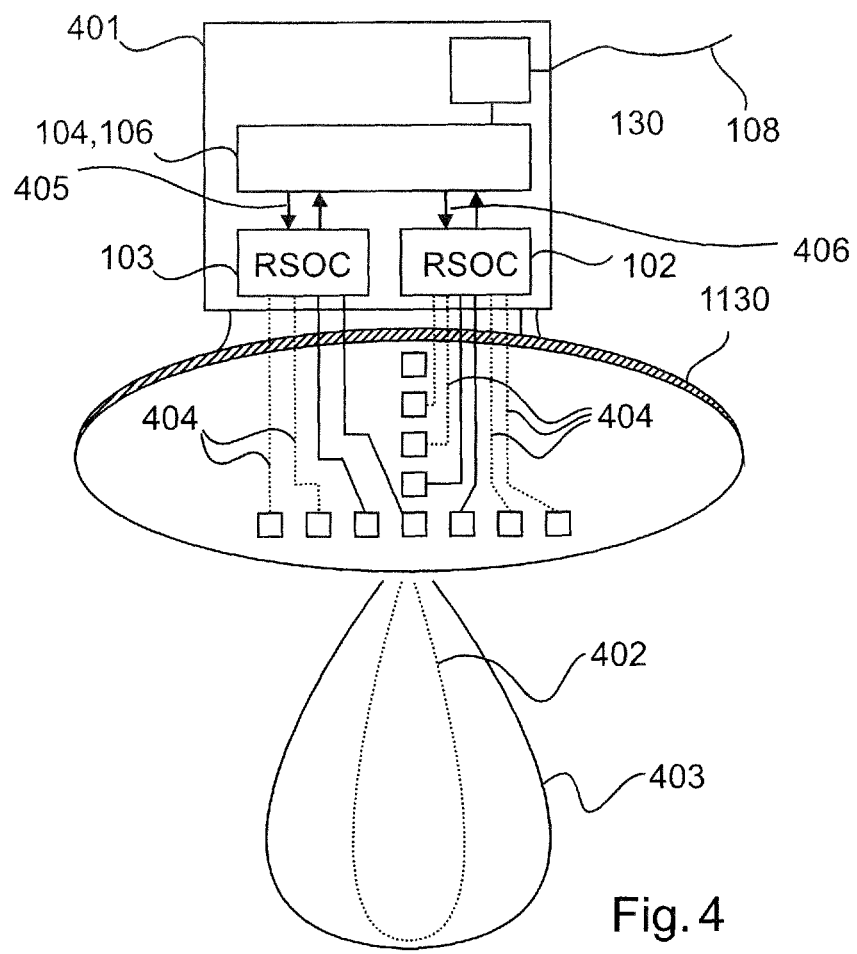
FIG. 4 shows a radar fill level measurement device according to one embodiment.

FIG. 4 shows a further particularly advantageous embodiment of a radar level indicator 401. On the hardware side, the measurement device consists of the same components as the device 101 in FIG. 1, but instead has an operating sequence for the entire system 401 that is changed in the control and evaluation circuit 104, 106. The transmitting elements 109 to 112 are connected to the RSOCs 102, 103 by means of hardware. The receiving elements 113 to 119 are likewise rigidly connected to the corresponding inputs of the RSOCs 102, 103.

In a first operating phase of the measurement device 401, all of the transmitting elements 109 to 112 are supplied, one after another or in parallel, with suitable transmission signals. At the same time as the emission of signals via the elements 109 to 112, the signals reflected from the filling material 114 are received, digitalised and forwarded to the evaluation circuit 106 by the receiving elements 113 to 119. Digital beamforming may be provided within the evaluation circuit, which beamforming uses one part of or even all of the signals received by the elements 113 to 119 in order to determine the reflection ratios in a predeterminable direction. In this operating mode, very narrow focusing 402, 501 of the resulting antenna lobes in the sensor can be achieved.

Figure 5:
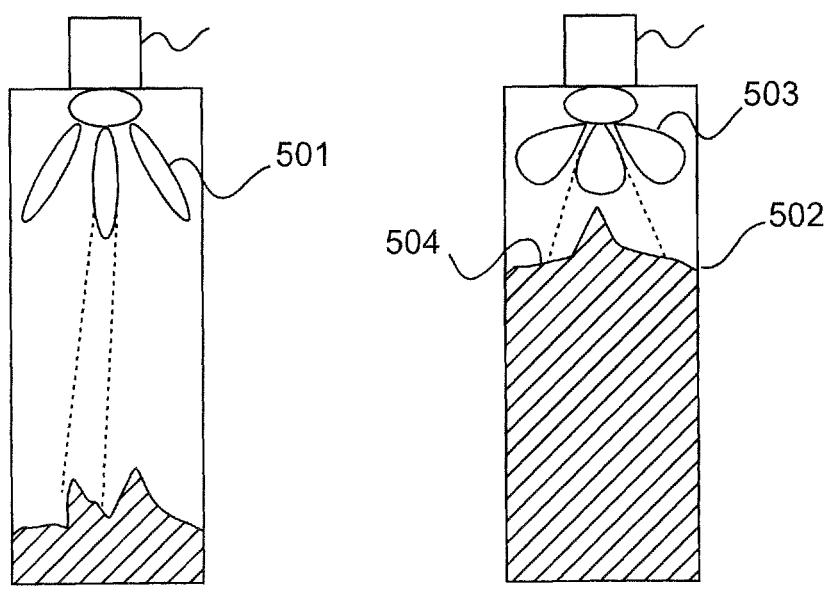
FIG. 5 shows an application in a tall, thin silo.

FIG. 5 shows a corresponding embodiment in a tall, thin silo. The disadvantage of this operating mode is the immense computing power incurred by the large amount of data and the high energy requirement, caused by the large number of transmitting and receiving channels which are used for the detection of data. The measurement device may therefore fully automatically change the operating mode thereof depending on particular results and conditions (e.g. filling height, shape of the container, shape of the surface, temperature of the electronics and surroundings, certification conditions in the commissioning country).

FIG. 4 shows the signal flow for a second operating sequence. Based on the result of a previous measurement of the filling height 502 in the container, the measurement device can determine that wider focusing of the resulting antenna lobes 403, 503 is sufficient in order to measure the surface 114, 504 of a filling material in the desired quality. This therefore changes the operating sequence such that the measurement device carries out a further measurement only by using a portion of the transmitting elements 109 to 112 and/or the receiving elements 113 to 119. In the present example, the signal paths 404 shown by dashed lines are not used for the measurement in the second operating sequence. This leads to saving energy, measurement time and computing time for evaluating the signals. Transmitting and/or receiving channels can generally be deactivated by corresponding control signals 405, 406. In a particularly advantageous embodiment, the evaluation logic can also interrupt the reading-in of the signals of non-activated receiving elements 113, 114, 118, 119, and this can contribute to a further acceleration of the operating mode.

Figure 6:
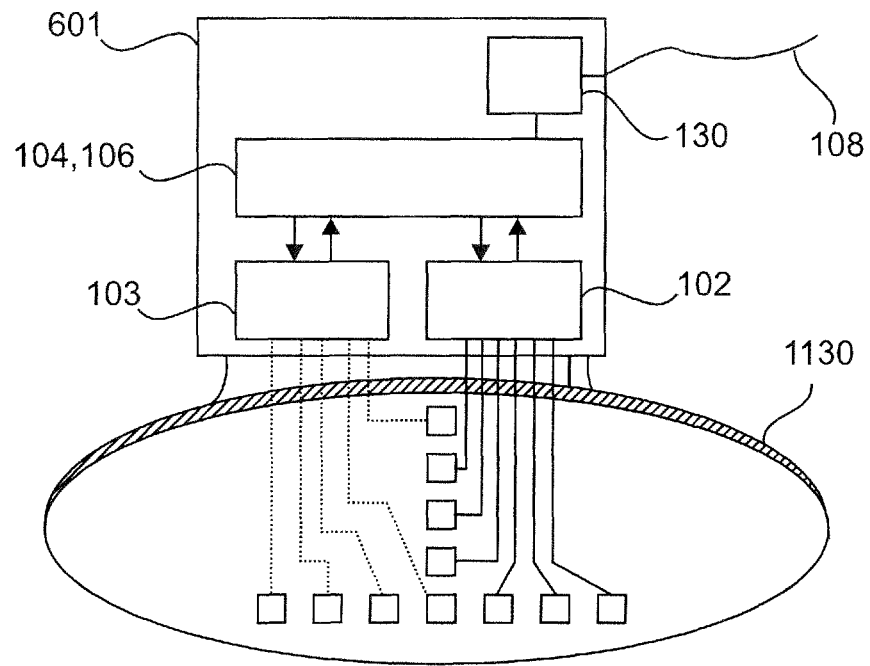
FIG. 6 shows a radar fill level measurement device according to one embodiment.

FIG. 6 shows a further radar level indicator. The measurement device 601 in turn has two operating modes which can be activated automatically depending on external influences. The present example shows a reaction to a changed energy budget and/or to changed temperature conditions. Whereas, in one state in which there is a sufficiently good energy supply, the measurement device 601 can implement an operating mode according to the apparatus 101, the device can fully automatically change into a second operating mode when the energy budget is reduced and/or an upper limit temperature is reached, in which second operating mode only a reduced number of RSOCs is used for the measurement. Whereas in the first operating mode, the two radar chips 102, 103 and therefore a plurality of transmitting elements or antennas 109 to 112 and receiving elements 113 to 119 are used to detect a plurality of echo curves, in a second operating mode the control apparatus 104 deactivates the second RSOC 103. The measurement is then carried out exclusively by the first RSOC 102 and the antenna elements 110 to 112, 117 to 119.

The energy consumption of the system is considerably reduced as a result. It is also possible for the radar chips 102, 103, in a third operating mode, to be alternately actuated in successive measurement cycles by the transmitting and receiving elements connected thereto in each case. This measure means that the heating of the electronics can be controlled and influenced in a targeted manner. The evaluation circuit 106 communicates with the actuation circuit 104 in order to suitably optimise and adapt the evaluation of the signals depending on the operating mode selected.

Figure 7:
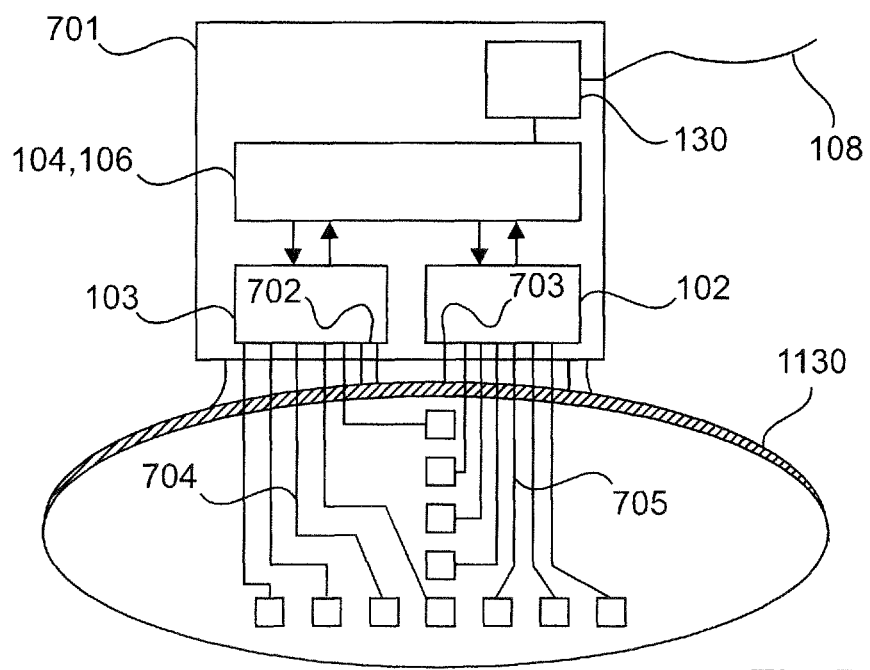
FIG. 7 shows a radar fill level measurement device according to one embodiment.

FIG. 7 again illustrates a particularly advantageous embodiment of a radar level indicator or sensor 701. The sensor comprises two standard RSOCs 102, 103, each having three transmitting channels and four receiving channels. The use of these standard ICs that are produced in large quantities makes it possible for a radar level indicator 701 to be assembled cost-effectively. With regard to an antenna apparatus 1130 that is optimised in terms of system considerations, it is possible for a first portion of the transmitting and/or receiving channels 704, 705 to be connected to the transmitting and receiving apparatuses of the antenna apparatus 1130. The control apparatus 104, 106 is designed to deactivate, i.e. transfer into an energy-optimised state, the unused transmitting and/or receiving channels 702, 703 of the radar chips 102, 103. The evaluation apparatus 106 is designed to receive only one part of the data provided by the radar chips 702, 703 and/or to process only one part of the signals. The control apparatus 104 is designed to activate only one part of transmitting channels that can be activated in the radar chip during a measurement cycle. Energy can be saved by means of this measure.

FIG. 8 shows a further embodiment. The device 801 is in turn characterised by the ability to change the operating and evaluating mode during the delay. The transmitting elements 109 to 112 may be positioned at a distance dy 120 of less than or equal to half the wavelength of the emitted high-frequency signal. It is also possible for the delay of the high-frequency signal from the radar chips 102, 103 to the transmitting elements 109 to 112 to be made substantially equal by introducing corresponding compensation structures 802, 803 for all the transmitting channels. In this way, it is possible for the measurement device 801 to be operated, in a second operating mode, as a real-time beamformer in the transmitting operation so as to have analogue beamforming as a phased array. Only one one-dimensional digital beamforming is then required on the receiving side.

In a first operating mode, the same measurement device 801 may be operated so as to have fully digital beamforming. FIGS. 9A to 9D show an actuation sequence for the two operating modes. The charts 901 and 902 in FIGS. 9A and 9B illustrate the first operating mode having fully digital beamforming in the evaluation unit 106. The control unit 104 first activates the first transmitting channel of the radar chip 103. The signal emitted by the transmission unit 109 is received by the simultaneously operated receiving channels of the radar chips that are connected to the elements 113 to 119, and is forwarded in digital form to the evaluation chip. In a subsequent phase, the second transmitting channel in the radar chip 103 is activated. The simultaneously received signals are in turn forwarded to the evaluation unit 106 and stored. In a third phase, the transmitting element 111 is subjected to transmission signals from the second radar chip 102. The detection of measurement data ends after all of the transmitting channels used for the measurement have been passed through. After all of the radar chips have been deactivated, the evaluation unit 106 conducts a method for digital beamforming in two dimensions using echo signals which are connected to transmitting and receiving elements actually used. The method is advantageous in that, within the evaluation, any echo curves can be digitally synthesised for predeterminable angle directions. A disadvantage is the high computing power and the long measurement time.

It is therefore possible for analogue transmit beamforming to be carried out in a second operating mode. The sequence charts 903, 904 in FIGS. 9C and 9D illustrate the actuation sequences necessary for this purpose. The operating mode is characterised in that, in contrast to the previously mentioned sequence, at least two or advantageously all of the TX channels of the radar chips 102, 103 that are connected to transmitting elements are activated simultaneously. By means of the phase shifter present in the radar chips, a phase offset between the transmission signals can be adjusted in a targeted manner, as a result of which the resulting transmission signal superimposes to a maximum in a predefined spatial direction (analogue beamforming). In order to detect a plurality of spatial directions, the phase offset between the transmitting channels is varied in successive measurement cycles. The method can be temporally extended or even shortened depending on the range of spatial directions which is intended to be detected. During all of the transmission phases, the receiving stages of the radar chips 102, 103 that are connected to the receiving elements 113 to 119 are activated, and the detected data is transmitted to the evaluation unit. The evaluation unit 106, taking into consideration the currently adjusted phase specifications for the transmission signals, conducts one-dimensional digital beamforming for the received signals, as a result of which beamforming occurs in an angle direction which is substantially perpendicular to the angle direction of the beamforming incurred by the transmit beamforming.

It is possible, instead of or in addition to the compensation structures 802, 803, for a value detected by factory calibration to be taken into account for a calibration phase within the actuation circuit 104. It is also possible to compensate for amplitude differences between the transmission signals by correspondingly adjusting the transmission amplifiers within the radar chips 102, 103.

For the sake of completeness, it should be noted that "comprising" and "having" do not preclude the possibility of other elements or steps, and the use of the indefinite article "a", or "an", does not preclude the possibility of a plurality.

It should further be pointed out that features or steps described with reference to one of the above embodiments may also be used in combination with other features or steps of other above-described embodiments. Reference numerals in the claims should not be considered limiting.

The invention claimed is:

1. A radar fill level measurement device for measurement of a fill level in a container, comprising:
    an arrangement including a single radar chip, the arrangement having a plurality of transmitting channels, each of the transmitting channels being configured to generate a transmission signal and/or at least one receiving channel, each of the receiving channels being configured to detect the transmission signal reflected from a filling material surface;
    an antenna arrangement having at least one transmitting element and at least one receiving element; and
    a control circuit configured to activate one of at least two operating states of the device,
    wherein a different number of the transmitting channels and/or the receiving channels is used in each of the at least two operating states, and
    wherein, in one of the at least two operating state, the control circuit is configured to deactivate (a) all transmitting channels but one and (b) all receiving channels but one.

2. The device according to claim 1, wherein the at least one the plurality of transmitting channels includes a first number of transmitting channels, the at least one transmitting element includes a second number of transmitting elements, the at least one receiving channel includes a third number of receiving channels, the at least one receiving element includes a fourth number of receiving elements and wherein (a) the first number of the transmitting channels is greater than the second number of the transmitting elements and/or (b) the third number of the receiving channels is greater than the fourth number of the receiving elements.

3. The device according to claim 2, wherein at least one of the transmitting channels is designed as a combined transmitting-receiving channel.

4. The device according to claim 1, wherein the radar chip is configured to transmit and receive the transmission signal and the arrangement further includes an integrated microwave circuit that is configured only to transmit the transmission signal or only to receive the transmission signal reflected from the filling material surface.

5. The device according to claim 1, wherein the control circuit is configured to activate and deactivate one of the at least two operating states depending on the fill level.

6. The device according to claim 1, wherein the control circuit is configured to deactivate a component of the arrangement.

7. The device according to claim 1, wherein an analogue-digital converter is integrated on the radar chip.

8. The device according to claim 1, wherein the device is configured for measuring the fill level of a medium in the container.

9. The device according to claim 1, wherein the device is an FMCW fill level measurement device.

10. A radar fill level measurement device for measurement of a fill level in a container, comprising:
    an arrangement including at least two radar chips, the arrangement having a plurality of transmitting channels, each of the transmitting channels being configured to generate a transmission signal and/or a plurality of receiving channels, each of the receiving channels being configured to detect the transmission signal reflected from a filling material surface;
    an antenna arrangement having a transmitting element and a receiving element; and
    a control circuit configured to activate one of at least two operating states of the device,
    wherein the device has (a) a first number of the transmitting channels which is greater than a second number of the transmitting elements and/or (b) a third number of the receiving channels which is greater than a fourth number of the receiving elements,
    wherein a different number of the transmitting channels and/or the receiving channels is used in each of the at least two operating states, and
    wherein, in one of the at least two operating state, the control circuit is configured to deactivate (a) all transmitting channels but one and (b) all receiving channels but one.

* * * * *